United States Patent [19]
Bones, IV

[11] Patent Number: 5,628,279
[45] Date of Patent: May 13, 1997

[54] FISH CAGE

[76] Inventor: John W. Bones, IV, 1115 Hwy. 146 N. #501, Texas City, Tex. 77590

[21] Appl. No.: 431,548

[22] Filed: May 1, 1995

[51] Int. Cl.$^6$ ............................................. A01K 63/00
[52] U.S. Cl. ............................................. 119/215; 119/223
[58] Field of Search ............................ 119/215, 223, 119/228

[56] References Cited

U.S. PATENT DOCUMENTS

| | | | |
|---|---|---|---|
| 3,691,994 | 9/1972 | McPherson | 119/223 |
| 3,717,124 | 2/1973 | Jacobs | 119/223 |
| 4,594,965 | 6/1986 | Asher, Jr. et al. | 119/239 |
| 4,610,219 | 9/1986 | Morimura | 119/223 |
| 4,744,331 | 5/1988 | Whiffin | 119/223 |
| 4,747,369 | 5/1988 | Gotmalm | 119/223 |
| 5,172,649 | 12/1992 | Bourgeois | 119/223 |
| 5,299,530 | 4/1994 | Mukadam et al. | 119/223 |
| 5,438,958 | 8/1995 | Ericsson et al. | 119/223 |

OTHER PUBLICATIONS

Devoe Coatings; *Mini Catalog*; (4 p.) Nov. 1989.
Sea Trek, Ocean Farming System; *Sea Pride to Revolutionize Fishing Industry in Gulf of Mexico* (2 p.); Robert Green; Feb. 1993.
Fibergate Corporation; Corvex™ *Full–Featured, Economy Grating*; (2 p.) 1991.
Briner Paint Mfg. Co., Inc.; *Product Data Sheet 565 Inorganic Zinc Primer*; (2 p.) Revised Aug. 1992.
Fisher Controls; *The Fisher ROC312. Small in size. Big in flexability*. (2 p.); Oct. 1992.
Fisher Controls; *ROC312 Remote Operations Controller; Fishbone Cage System Bill of Material*; (1 p.); Nov. 11, 1994.
Fisher Controls Int., Inc.; *ROC300–Series Modem Communications Cards;* (pp. 1–4); Jul. 1994.
Fisher Controls Int., Inc.; *Type ROC312 Remote Operations Controller;* (pp. 1–4); Mar. 1993.
Fisher Controls Int., Inc.; *ROC300–Series Discrete Input Source and Isolated Modules;* (pp. 1–2); Jun. 1993.
Fisher Controls Int., Inc.; *ROC300–Series Discrete Output Relay Module;* (pp. 1–2); Sep. 1994.
Fisher Controls Int., Inc.; *ROC300–Series Memory Modules;* (pp. 1–4); Jun. 1993.
Fisher Controls Int., Inc.; *Type GV101 Configuration Software (Version 1.5);* (pp. 1–2); Aug. 1994.

*Primary Examiner*—Robert P. Swiatek
*Assistant Examiner*—Yvonne R. Abbott
*Attorney, Agent, or Firm*—Conley, Rose & Tayon, P.C.

[57] ABSTRACT

A fish cage, comprising: a rigid hexagonal frame enclosed in a grating skin and including a feed tube extending through said grating skin for providing feed to the interior of the cage. The delivery of feed from the cage through the tube is controlled by a control module that may also control a water flush system for flushing feed through the tube. A novel fastener, comprising a back, a nut-supporting length of tubing, an internally threaded nut permanently mounted in the tubing, and a bolt that can be threaded into the nut. The back extends beyond the tubing, so that the back engages the grating skin when the fastener is in use.

7 Claims, 10 Drawing Sheets

FISH CAGE

BACKGROUND OF THE INVENTION

The present invention is directed to a system and device for the aqua farming of fish in open bodies of water. At the present time, most fish farm systems are located on dry land and use ponds and/or tanks to raise fresh water or salt water fish. These operations have several drawbacks. First, such systems have a fairly high capital requirement for the purchase or lease of the land and for the construction of the ponds and tanks, which must be fabricated of materials resistant to the corrosive effects of fresh or salt water. The operations of the tanks and ponds are also expensive because the water quality of the ponds and tanks must be carefully monitored and controlled. If the water quality is allowed to deviate from the normal, the growth rate and health of the fish is dramatically affected. In fact, if the water quality is not strictly controlled, the growth rate of the fish decreases and the mortality rate increases. A further disadvantage of raising fish in ponds or tanks arises from the health considerations. Fish are susceptible to a number of diseases. Once a tank or pond is infected, it is virtually impossible to save the fish being raised in that pond or tank. A further disadvantage associated with tanks and ponds is their susceptibility to temperature fluctuations caused by weather conditions. During hot spells, the water temperature of a tank or pond can reach 80° F. or more, unless the water is cooled or flushed with cool water. Likewise, during freezing spells, the water temperature of a tank or pond can drop to near freezing, unless the water is heated or flushed with warm water. Even when the water temperature does not reach such extremes, excessively warm or cool water temperatures can adversely affect the fish growth rate. Another problem associated with the construction and operation of artificial ponds and tanks is the availability of clean water and the disposal of waste. Ponds require an initial charge of water to fill and require additional make-up water and flush water during the operation in order to maintain at least a minimum quality of water for fish growth. Tanks also require an initial charge of water and make up water during operation. If the tank has a water treatment set-up, the water does not have to be flushed, but make up water is required and if the air and/or minerals content of the water builds up, the water must be diluted with fresh water. Solids filtered out of the water must be disposed of in an environmentally acceptable manner.

Because of these problems, a number of attempts have been made to raise fish in open bodies of water, such as in the ocean and in large lakes. These open bodies of water, because of currents and the winds, are constantly being churned so that the water does not stagnate. This is an ideal environment for raising fish. However, raising fish in an open body of water has its own difficulties, including caging the fish, harvesting the fish from the cages, feeding the fish, and protecting the fish cage and the fish therein from the actions of current, waves and wind in the open bodies of water.

SUMMARY OF THE INVENTION

Applicants have found that the offshore oil well platforms after shut-down of the oil and/or gas operations make ideal anchor points and operation points for open-water fish farming. A remotely operated automatic fish feeding system can be installed on the platform. The platforms have the facilities for receiving personnel, equipment and supplies by boat and/or helicopter. The platforms can be adapted to support and or house operating personnel and are designed to withstand high winds, water currents, wave actions and storms. Although the present invention is most conveniently operated in conjunction with an off-shore oil well platform, the invention can be operated in the absence of a platform. For example, the present invention can be operated in a bay, ocean, lake or inlet with the device being provided with floatation means and being anchored to the sea bottom or lake bottom.

Because the present fish cage is located in open water, where the water is constantly in motion, the water in the cage is constantly circulating and the fish are raised in a nearly natural environment. As with any population, a certain number of fish will die during the growing season. The dead fish will drop to the bottom of the enclosed net cage wherein they will decompose by natural processes. Because of the constant circulation of water through the cage, the decomposition products of the dead fish are continuously washed out of the cage so that they do not accumulate and do not affect the fish. It has been found that fish raised in open waters have a much faster growth rate than fish raised in ponds and tanks and that the mortality rate of fish grown in open waters is lower than the mortality rate of fish raised in ponds and tanks.

Another advantage of the present invention is that it can be used on abandoned drilling rigs, from which power supplies have been disconnected or removed. The present invention can be adapted to operate as a stand-alone, self-sufficient unit, deriving all of the power necessary for operation from solar power.

Other objects and advantages of the invention will appear from the following description.

BRIEF DESCRIPTION OF THE DRAWINGS

For a detailed description of a preferred embodiment of the invention reference will now be made to the accompanying drawings wherein.

DETAILED DESCRIPTION OF THE INVENTION

Figure 1:
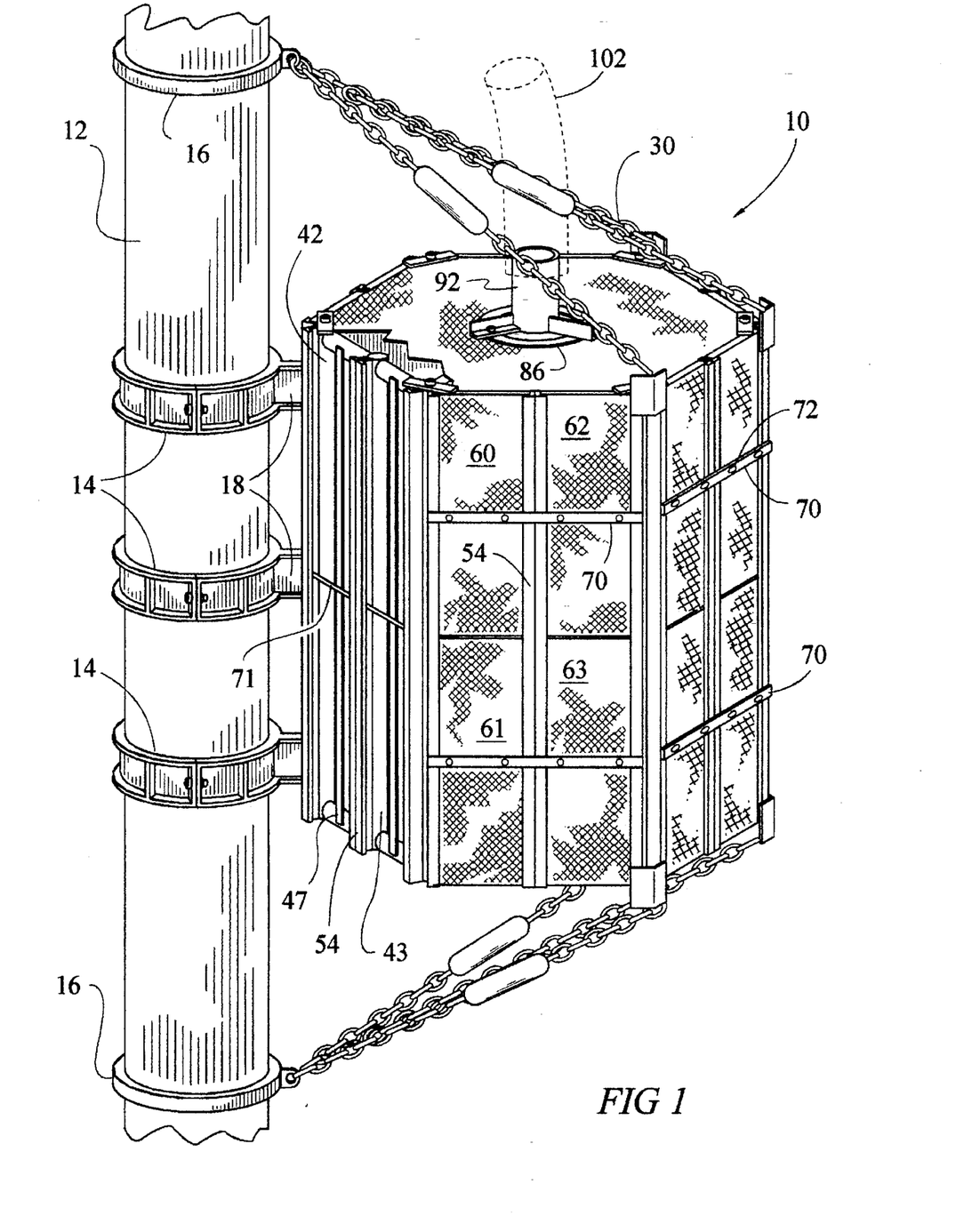
FIG. 1 is a perspective view of a fish cage according to the present invention and having the grating panels removed from one face.

Referring initially to FIG. 1, the present invention comprises a fish cage 10 mounted on a stand pipe 12. Stand pipe 12 is preferably one leg of an offshore drilling platform, but may be any similar rigid support member. A plurality of support clamps 14 mounted on pipe 12 support cage 10, and a plurality of bracing clamps 16 provide added support. Support clamps 14 are affixed to cage 10 by means of I-beam sections 18, and each bracing clamp 16 supports a plurality of chains 30 which are affixed to cage 10. The construction of clamps 14 and 16 and their attachment to cage 10 is discussed in greater detail below.

Figure 2:
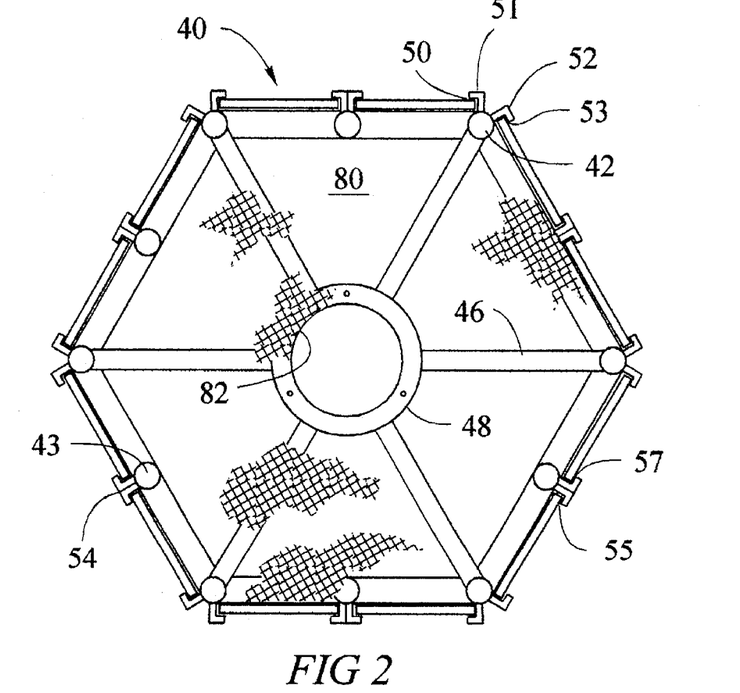
FIG. 2 is a top view of the cage of FIG. 1 without the top assembly in place.
Figure 2A:
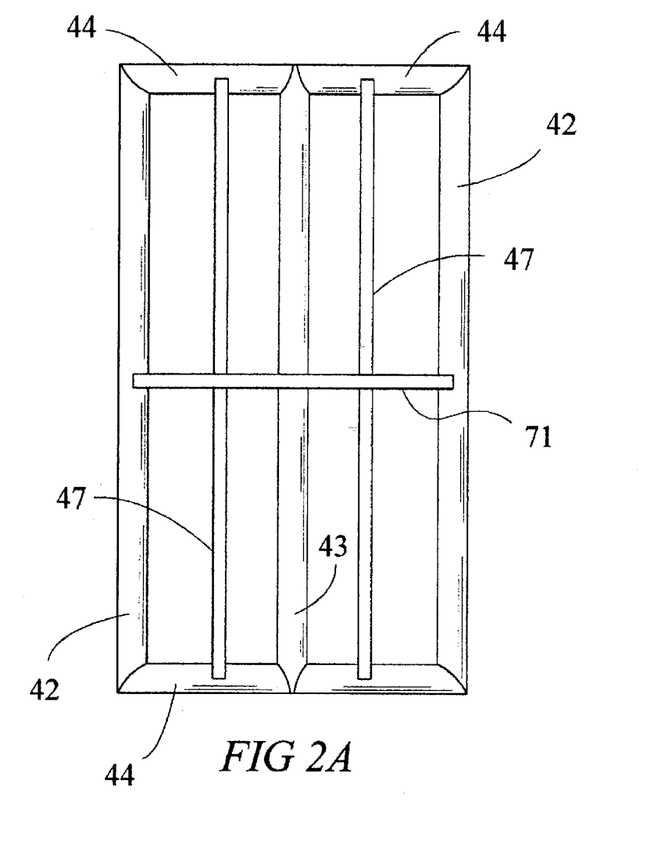
FIG. 2A is a side view of one face of the cage frame shown FIG. 1 with the grating and grating guides removed from the frame.

Referring now to FIGS. 1, 2 and 2A, cage 10 comprises a frame 40 on which a plurality of rigid grating panels 60 are mounted. According to a preferred embodiment, frame 40 is a tight hexagonal prism comprising six vertical apex members 42 and six vertical face members 43 defining the sides of the hexagon, and at each end six peripheral members 44 and six radial members 46. The ends of two adjacent peripheral members 44 and one radial member 46 are permanently affixed to each end of each apex member 42. Members 42, 44 and 46 may be permanently and rigidly joined by welding or the like. Vertical face members 43 are preferably affixed to the center points of corresponding upper and lower peripheral members 44. Referring now particularly to FIG. 2, at the top of cage 10 the inner ends of radial members 46 are affixed to a top ring 48. Ring 48 is preferably a single piece of metal that has been formed into a continuous ring. Ring 48 includes a plurality of bolt holes 49 extending vertically therethrough. Radial members 46 are affixed to ring 48 by welding or the like. The bottom of cage 10 is constructed in a like manner.

Referring now to FIGS. 1 and 2A, An additional horizontal support 71 is welded to adjacent vertical members 42. Support strip 71 is preferably a length of flat bar. Support strip 71 is positioned to support the adjacent edges of the upper and lower rows of panels. Lastly, according to a preferred embodiment, a vertical stringer 47 extends from each top peripheral member 46 to a corresponding bottom peripheral member between each pair of vertical members 42, 43 and internally of horizontal mounting strips 70. All of the frame members described above are preferably welded into place.

Figure 2B:
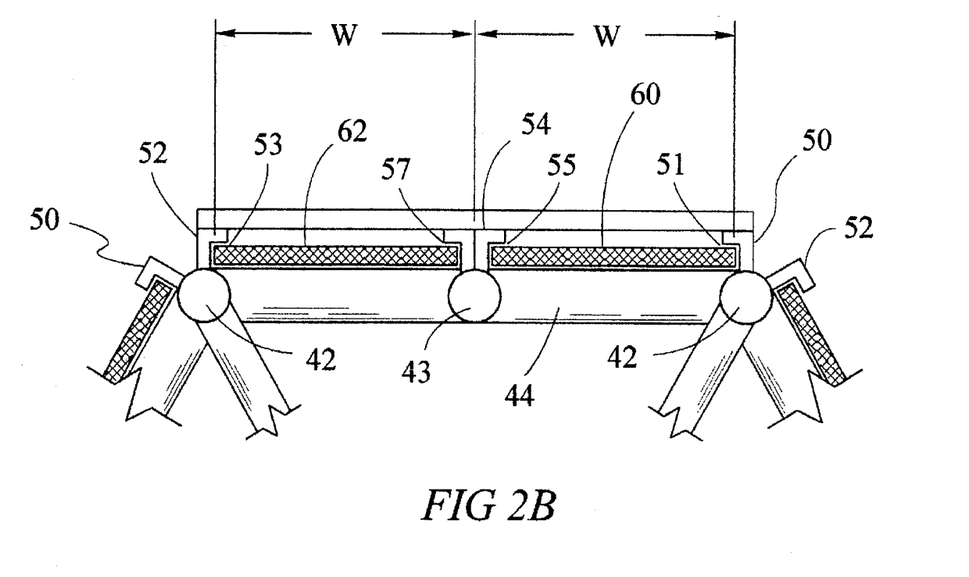
FIG. 2B is an enlarged view of a portion of the top of the cage shown FIG. 1.

Referring now to FIGS. 2 and 2B, the outside of each apex member 42 supports a pair of right-angle retaining strips 50, 52 defining grooves 51, 53, respectively. Right-angle retaining strips 50, 52 are rigidly mounted on apex member 42 such that a 60° angle is defined therebetween and grooves 51, 53 are each aligned with an adjacent face of cage 10.

In addition, each vertical face member 43 supports a T-shaped retaining strip 54 forming a pair of grooves 55, 57. T-shaped retaining strip 54 is mounted on face member 43 such that it extends radially therefrom and grooves 55, 57 are aligned with the face of cage 10.

In this manner, each pair of facing grooves 53, 57 and 55, 51 defines a slot having width W. Grating panels 60, 62 can be slid vertically into the slots defined by retaining strips 50, 52 and 54. The length and number of panels 60, 62 deter- mines the height of cage 10. In the embodiment shown in FIG. 1, a pair of panels is mounted lengthwise in each slot, so that one hexagonal face of cage 10 comprises panels 60, 61, 62, and 63.

Referring now to FIGS. 1 and 2B, two means are provided for retaining panels 60 and 62 in their respective slots. First, a plurality of horizontal mounting strips 70, are included on the outside of frame 40. Mounting strips 70 each preferably comprise a piece of angle iron welded or otherwise mounted to retaining strips 50, 54, 52 on adjacent vertical members 42, 43 at points midway between the upper and lower ends of each row of grating panels 60, 62 and 61, 63. Each mounting strip 70 extends across the entire width of each face of the hexagon. Panels 60–63 slide under strips 70 as they enter their respective retaining slots and are held in place longitudinally by being bolted to horizontal mounting strips 70. Each panel is affixed to a mounting strip 70 by a pair of fasteners 72 discussed in greater detail below.

Figure 3:
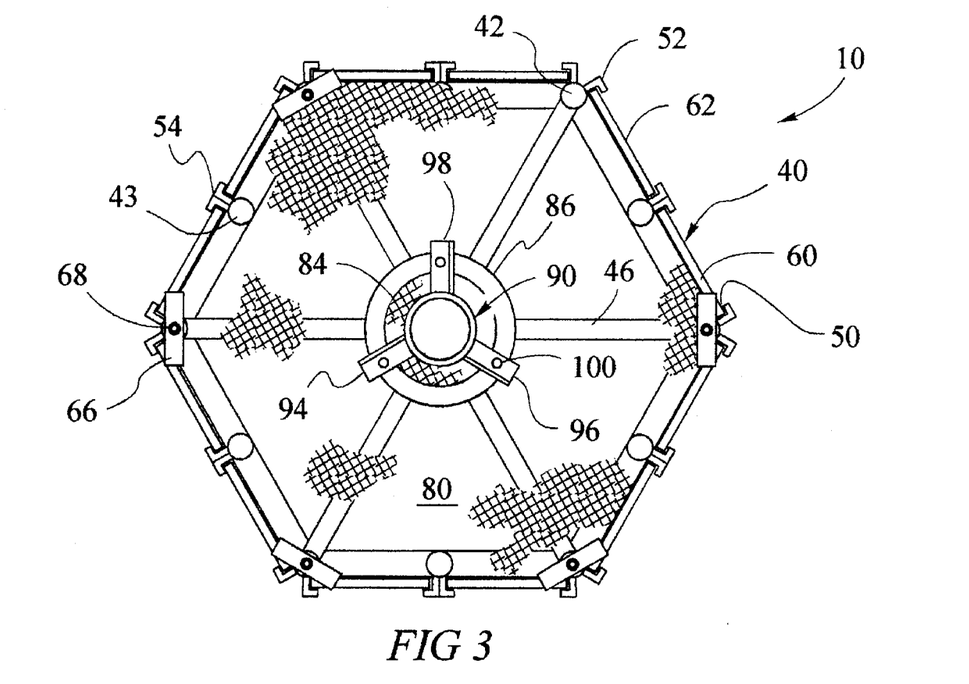
FIG. 3 is a top view of the cage of FIG. 1 with the center assembly in place.
Figure 5:
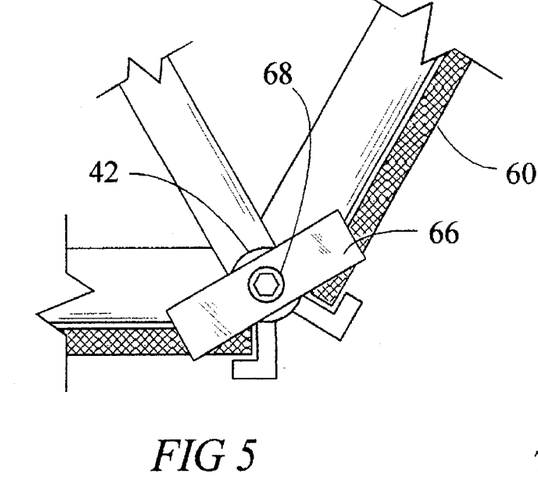
FIG. 5 is an enlarged view of one corner of the cage of FIG. 1, showing a pivotable retaining piece.

Second, on both the top and bottom of hexagonal cage 10, as best shown in FIGS. 3 and 5, a retaining piece 66 is pivotally mounted on each vertical apex member 42 by a cap screw 68. Five of the retaining pieces 66 are omitted from the drawing in FIG. 3 for simplicity's sake and it will be understood that a retaining piece 66 substantially as shown in FIG. 5 is mounted at each of the six apices. Retaining piece 66 is preferably dimensioned to be longer than the diameter of apex member 42, so that its end extends substantially beyond member 42 and across the ends of grooves 51, 53. In this manner, retaining piece 66 can be pivoted so that each of its ends closes one end of a retaining slot and thereby retains a corner of the corresponding panel in its respective slot. When it is desired to remove either of the panels, retaining piece 66 can be pivoted so that it does not obstruct the path of the panel as it slides out of the retaining slots. Retaining piece 66 is intended to function as a short term retaining device and as a back-up retaining device. Retaining pieces 66 are preferably always used in conjunction with mounting strips 70 and fasteners 72. The panels are not secured more firmly around their perimeters, as it is preferred that some movement of panels 60, 62 with respect to frame 40 be allowed, so as to prevent the build-up thereon of barnacles or other marine life.

Figure 6:
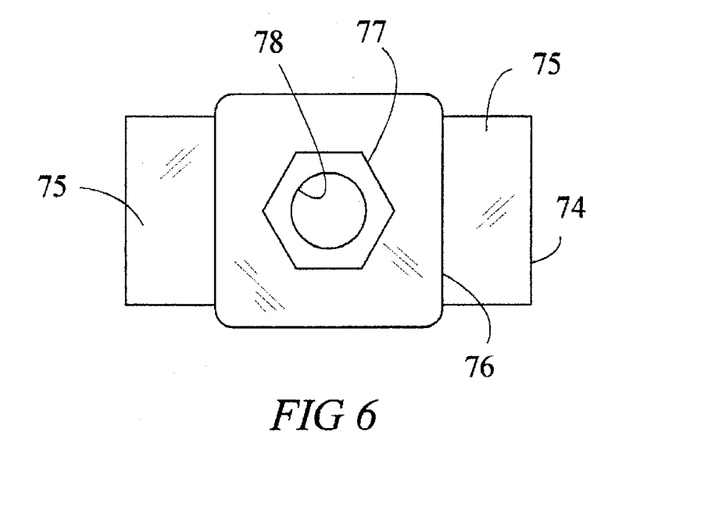
FIG. 6 is a back view of a fastener according to the present invention.
Figure 7:
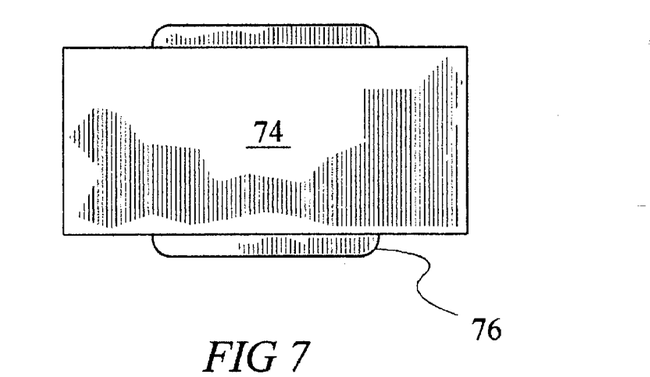
FIG. 7 is a front view of the fastener shown in FIG. 6.
Figure 8:
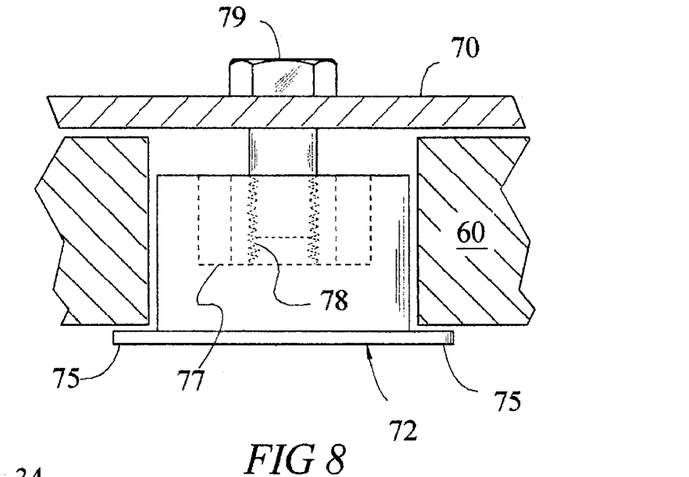
FIG. 8 is a top view of the fastener shown in FIG. 6 used to fasten a side grating panel to a mounting strip.

Referring now to FIGS. 6–8, each fastener 72 preferably comprises a back 74, to which a short length of square tubing 76 is permanently affixed. The ends of back 74 extend beyond tubing 76, forming a pair of ears 75. Tubing 76 includes a threaded nut 77 permanently mounted therein so that its outermost face is flush with the outer end of tubing 76. Nut 77 has a threaded bore 78 through its center for receiving a threaded bolt 79 as shown in FIG. 8. In use, fasteners 72 are positioned on the inside of each grating panel such that tubings 76 extend partially into the grating openings and bores 78 are aligned with bolt holes 73 in mounting strips 70. Bolts 79 are then threaded through mounting strip 70 and into bore 78. As bolt 79 advances in bore 78, back 74 is drawn toward mounting strip 70 and ears 75 bear against panel 60, thereby drawing panel 60 against mounting strip 70 and firmly affixing it thereto. Because mounting strips 70 are welded to frame 40, panel 60 is immobilized when connected in this manner.

Figure 4:
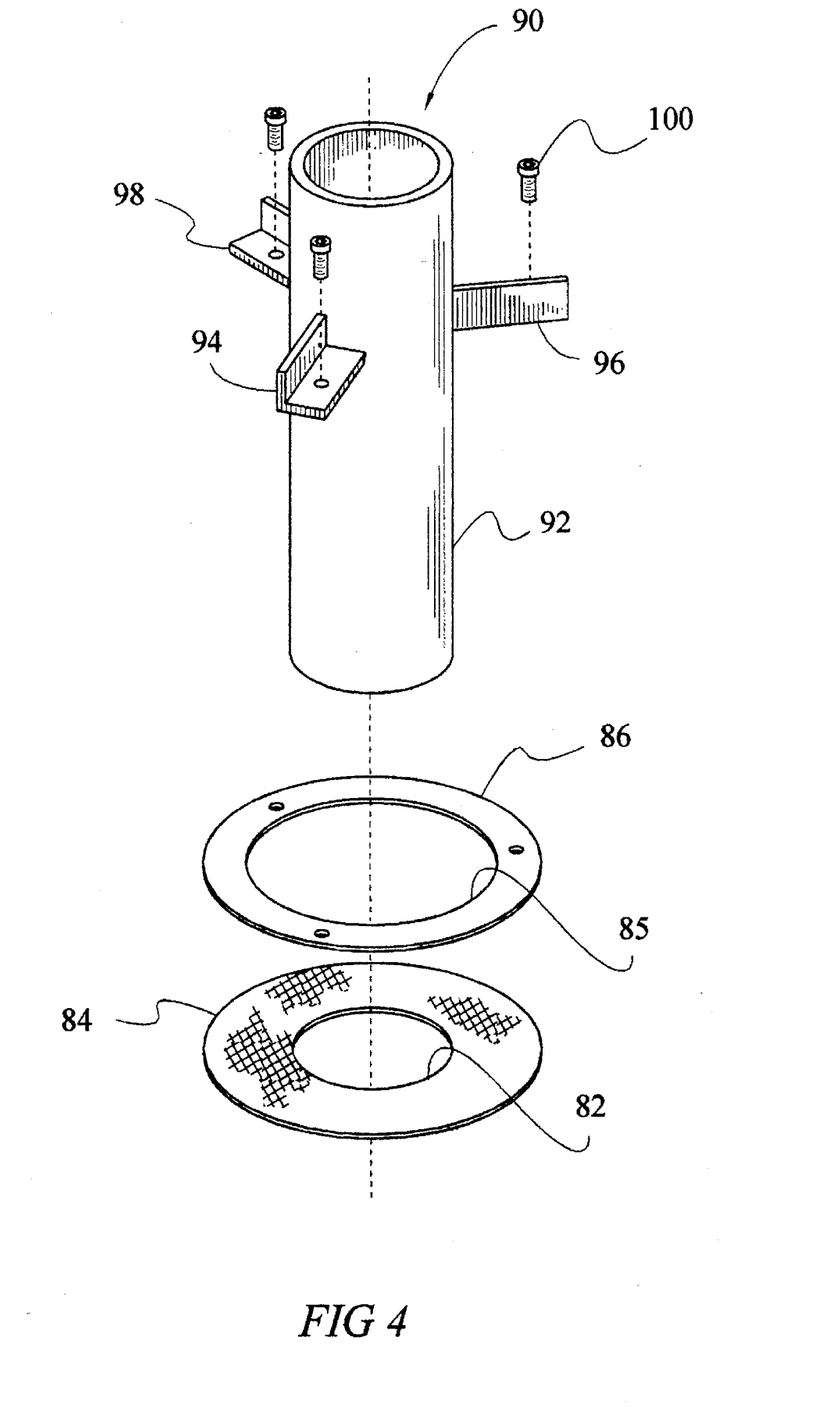
FIG. 4 is an exploded view of the center assembly shown in FIGS. 1 and 3.

Referring now to FIGS. 1, 3 and 4, the top assembly of hexagonal cage 10 comprises a generally hexagonal grating piece 80 having a central circular opening 82 therein, a circular grating piece 84 having a diameter slightly greater than the diameter of opening 82 and including a second central circular opening 85 therein, a clamping ring 86 and feed assembly 90. Feed assembly 90 includes a feed tube 92 having a male cam-lock fitting adjacent its upper end. Grating piece 80 is held in place on frame 40 by means of additional fasteners 72. Before the top assembly is in place, circular opening 82 and ring 46 define a man-way providing access to the interior of cage 10. To assemble cage 10 in preparation for use, circular piece 84 is placed over opening 82, clamping ring 86 is centered thereon, and feed assembly 90 is positioned so that feed pipe 92 extends through opening 85 and arms 94, 96, 98 rest on clamping ring 86. Bolts 100 can then be passed through aligned openings in arms 94, 96, 98 and ring 86 and extend into bolt holes 49 in ting 48, thereby securing the entire assembly. The bottom of cage 10 is assembled in a like manner, with the exception that opening 85 and feed assembly 90 are omitted and circular grating piece completely covers the man-way. Alternatively, the man-way can be omitted from the cage bottom and the bottom can be formed of a single hexagonal piece of grating.

To secure the top and bottom grating pieces of the cage to frame 40, the backs 74 of several fasteners 72 are welded to the outer surface of a frame 40 such that each length of tubing 76 extends into an opening in the grating. Bolt 79 passes through a washer and through the opening and is threaded into bore 78. As bolt 79 advances in bore 78, the washer bears against the grating, thereby drawing top panel 80 against frame 40 and firmly affixing it thereto.

The side panels 60 in conjunction with the top and bottom panels form a skin that completely encloses frame 40. Assembled in this manner, the entire structure has a mass of approximately 12,000 pounds.

Figure 9:
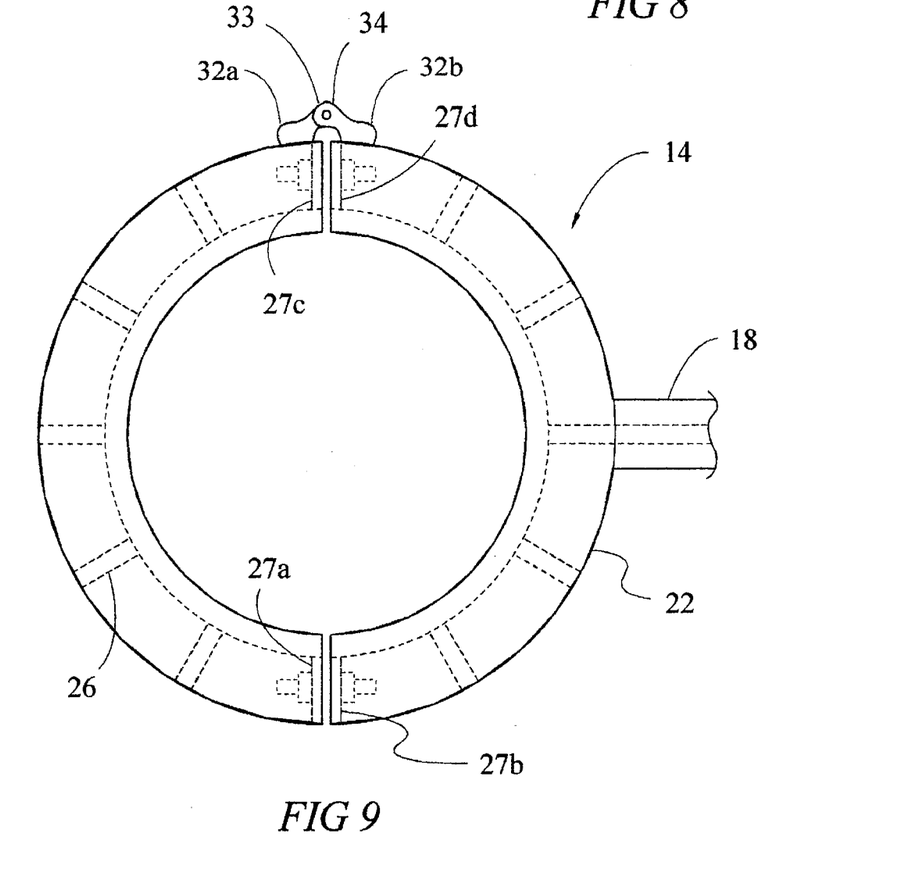
FIG. 9 is a plan view of a support brace according to the present invention.
Figure 10:
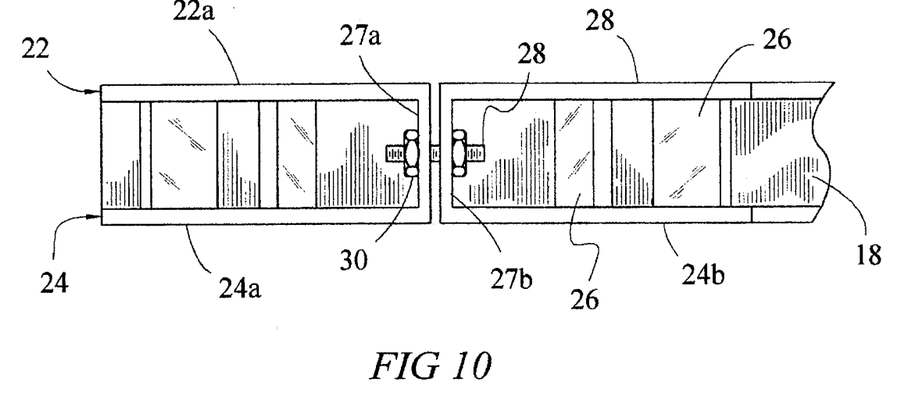
FIG. 10 is a side view of the support brace shown in FIG. 9.

Referring now to FIGS. 9 and 10, a preferred construction for support clamp 14 includes an upper ring 42 comprised of ring halves 22a, 22b, a lower ring 24 comprised of ring halves 24a, 24b, and a plurality of substantially radial cross-braces 26 affixed between upper ring 22 and lower ring 24. Locking cross-braces 27a, 27b, 27c, 27d, join corresponding ends of ring half 22a to ring half 24a, and ring half 22b to ring half 24b as shown. Locking cross-braces 27a–d each include a bore therethrough so that support clamp 14 can be assembled by threading a threaded stud 28 through corresponding openings in locking cross pieces 27a–b and 27c–d, and securing it with nuts 30 or the like. Other means for securing the ring halves a and b around stand pipe 12 are also acceptable, so long as the attachment is sufficiently strong to support cage 10 in the underwater environment.

Upper and lower rings 22, 24 are each preferably formed from a piece of 4×¼ inch metal bent along its long edge. Because support clamp 14 is so massive, it is preferred to include a hinge 32 joining ring halves a and b as shown. Hinge 32 preferably comprises hinge halves 32a, 32b, which are mutually pivotable around a pin 34. It is preferred that pin 34 be removable, so that once support clamp 14 is in place and nuts 30 have been secured, pin 34 can be removed to prevent it from locking up due to the corrosive effects of the sea water. When it is desired to remove support clamp 14 from pipe 12, pin 34 can be reinserted into hinge 32 before nuts 30 are loosened and studs 28 removed from the device. This allows the person removing the clamp to maintain better control over clamp 14 during the removal process. Support clamps 14 constructed in this manner form a rigid and rugged support for cage 10.

A length of I-beam 18 is preferably welded between upper and lower ring halves 22a, 24a and extends radially from ring 14. According to a preferred embodiment, the remote end of beam 18 is permanently affixed to cage 10, such as by welding it to one of the vertical apex members 42.

Bracing clamps 16 preferably comprise a length of angle iron that is wrapped to form a ring having a diameter substantially equal to the diameter of drill stand pipe 12. Bracing clamp 16 can be secured around drill pipe 12 by conventional means such as a threaded fastener, or the like. Each bracing clamp 16 includes a support ring 17 pivotally affixed thereto, to which chains 30 can be attached. Chains 30 each preferably include a load binder or "boomer", which allows the chains to be selectively lengthened or shortened so as to achieve a desired balance of cage 10.

Referring again to FIG. 1, a flexible feed tube 102 extends over the upper end of feed pipe 92 and is affixed thereto by means of a clamping ring (not shown). Flexible feed tube 102 is preferably secured to drill stand pipe 12 along its middle portion and extends from cage 10 to a desired feed storage location.

Figure 11:
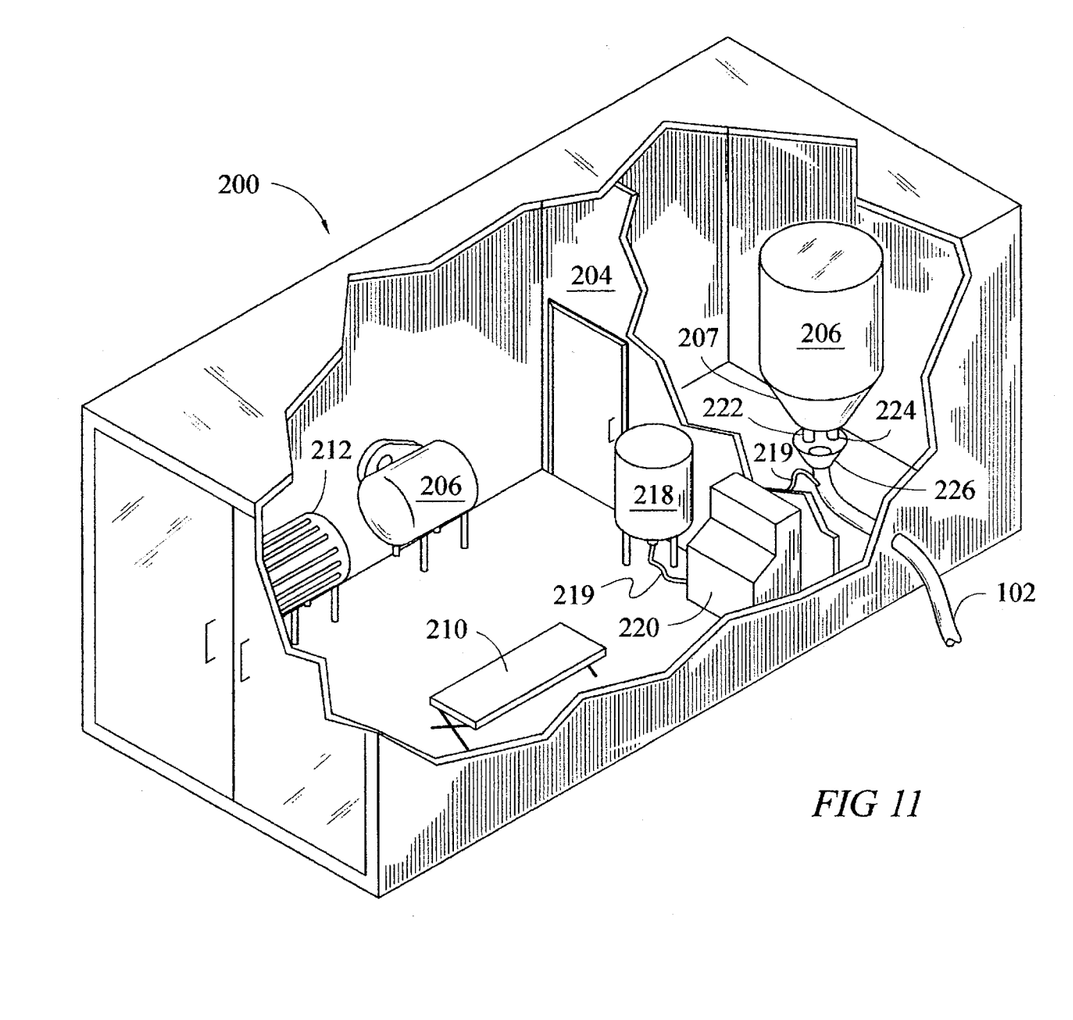
FIG. 11 is a schematic of a feed station according to the present invention.

Referring now to FIG. 11, according to the present invention, a preferred feed storage location comprises a self-contained feed station 200 comprising a standard cargo container that has been adapted to the present use. Container 202 includes a dividing wall 204, which forms feed storage bin 206 and an operations center 208. Operations center 208 preferably includes a bunk 210, a generator 212, an air compressor 214, a water tank 218 and a control module 220. Operations center 208 may be provided with various energy supplies, lighting, ventilation and other amenities as desired.

Feed storage bin 206 concludes a tapered floor 207 including twin feed chutes 222, 224. Below feed chutes 222, 224 is a funnel 226 which feeds into flexible feed tube 102. High and low feed level sensors 209a, 209b are positioned in storage bin 208 for sensing the level of feed therein. Feed level sensors 209a 209b are electrically connected to control module 220. Feed chutes 222, 224 are driven by feed motors 223, 225, respectively, which are in turn controlled by control module 220. A feed output sensor 228 is located below feed chutes 222, 224, for sensing whether feed is flowing. Sensor 228 is electrically connected to control module 220.

Water tank 218 is connected to flexible feed tube 102 by a water line 219. Water line 219 enters feed tube 102 downstream of funnel 226. A low level sensor 230 is located in water tank 219 for indicating when the water level therein drops below a predetermined level. Level sensor 230 is electrically connected to control module 220. The outlet of water tank through water line 219 is controlled by a solenoid valve 232, which is also electrically connected to control module 220. When a low water level is indicated by sensor 230 and the corresponding signal is received by control module 220, control module 220 activates a pump (not shown) for a predetermined time interval, which causes tank 218 to fill.

Figure 11A:
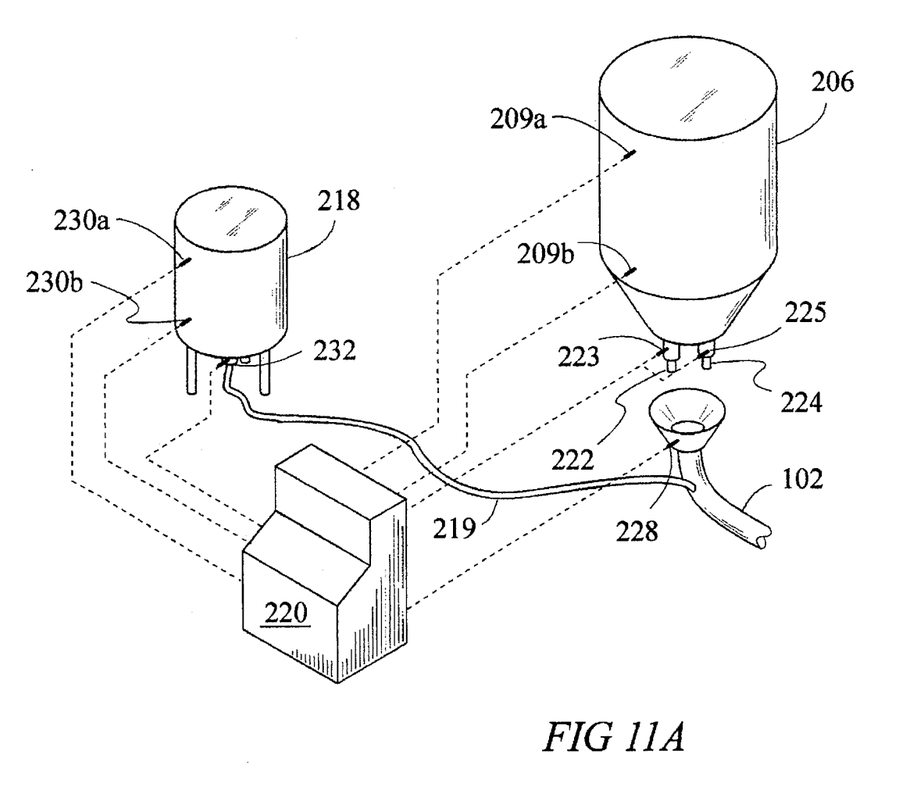
FIG. 11A is a schematic of the control loops of the feed station shown in FIG. 11.

Control module 220 is preferably a remote operations controller such as that provided under the trade name ROC312 by Fisher Controls of Marshalltown, Iowa. Control module 220 preferably has three analog input points, two discrete or pulse input points, one discrete output point, a switched output with a normally open contact, and six slots for plug-in I/O modules built into the unit. The I/O modules allow any combination of discrete inputs, discrete outputs, analog inputs, analog outputs, or pulse inputs. A preferred method of connecting the present system to the various inputs and outputs of control module 220 is shown in Table I.

TABLE I

ROC312 I/O CONFIGURATION

| I/O | Type | Description |
| --- | --- | --- |
| A1 | Analog-IN | |
| A2 | Analog-IN | |
| A3 | Analog-IN | |
| A4 | Digital-IN | Low $H_2O$ Saltwater Tank |
| A5 | Digital-IN | Food Pouring Indicator |
| A6 | Digital-OUT | 12 VDC Water Solenoid Valve |
| B1 | Digital-IN | HI Silo Pelletized Feeder |
| B2 | Digital-IN | Lo Silo Pelletized Feeder |
| B3 | Digital-IN | Sum/Pump 12 VDC |
| B4 | Digital-OUT | Motor 2 |
| B5 | Spare Slot | |
| B6 | Spare Slot | |
| AUX | Digital-OUT | Agitator Motor |

In operation, the control module 220 measures real time using an internal clock and turns on feed motors 223, 225 at predetermined, desired times. Motors 223, 225 can be operated simultaneously or independently. While the motors are on, control module 220 receives input from feed output sensors 228 indicating that feed is flowing through feed chutes 222, 224. At the end of the preset feed period, solenoid valve 232 is opened to allow a preset amount of water to flow through water line 219 and into feed tube 102, thereby flushing the feed down into cage 10.

Control module 220 is preferably accessible remotely by means of a dial-up modem, so that information can be transmitted to and from the control module without the presence of an operator at the cage site. In addition, all of the control circuits are preferably provided with manual overrides, so that in the event that control module 220 becomes inoperable, the system can be operated manually to prevent loss of the fish.

Figure 12:
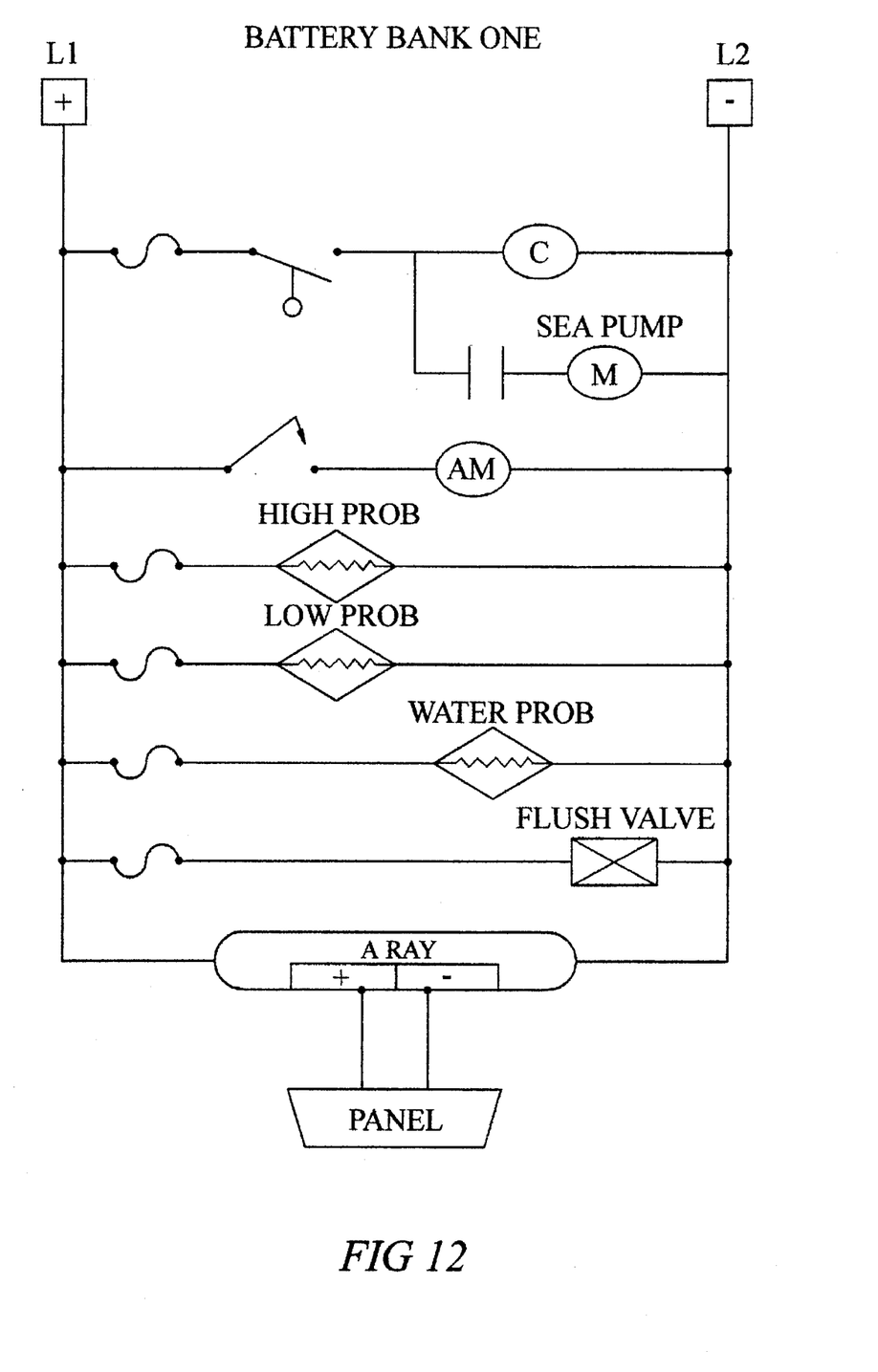
FIG. 12 is a wiring diagram of components connected to a first battery pack according to the present invention.
Figure 13:
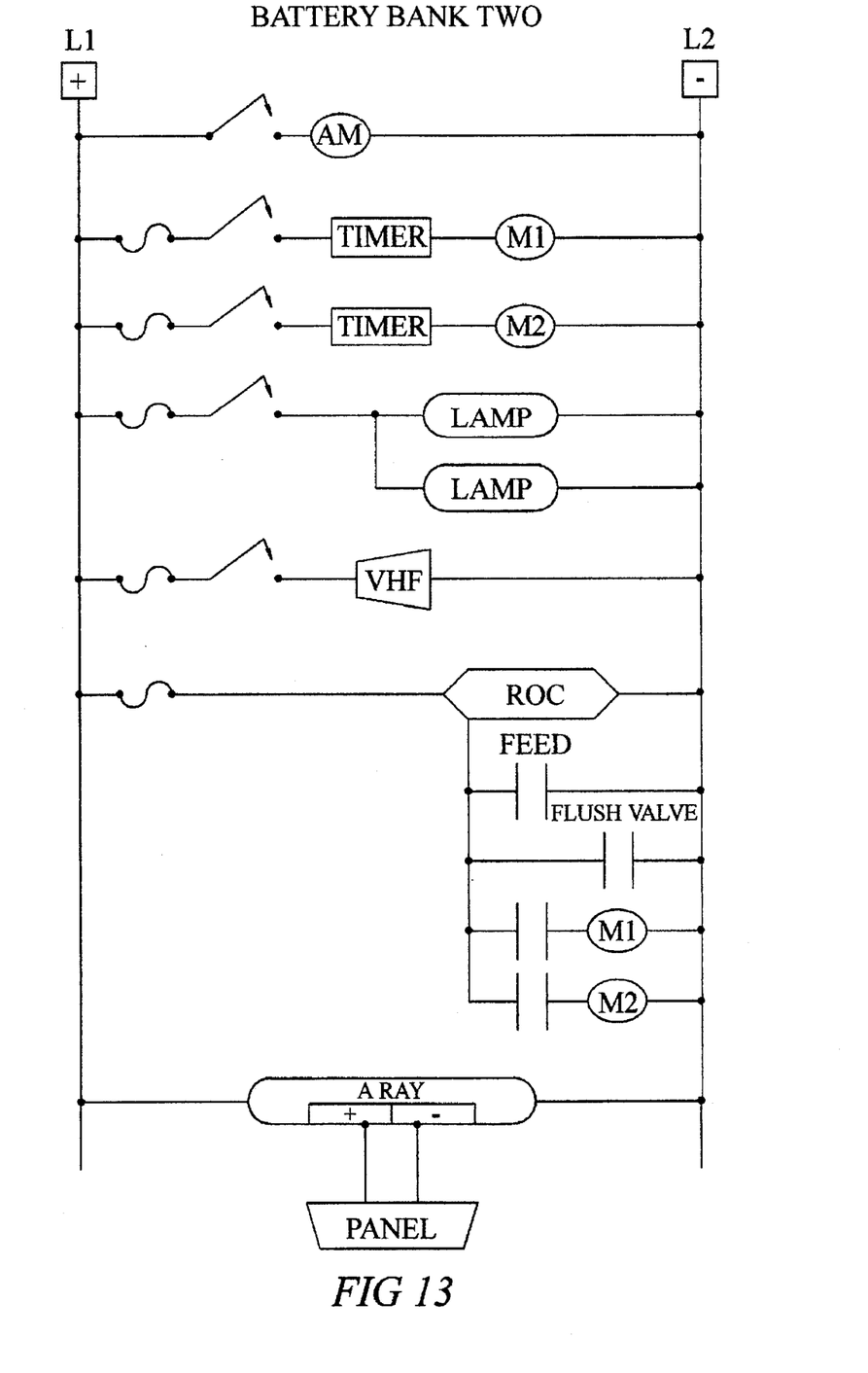
FIG. 13 is a wiring diagram of components connected to a second battery pack according to the present invention.

According to a preferred embodiment, all of the aforementioned equipment and controls are a selected to operate on no more than 12 V power source. The power is preferably collected and stored in one or more battery packs, to which at least one photovoltaic cell is connected. FIGS. 12 and 13 illustrate one possible way of configuring the components of the system on two battery packs. It is preferred that sufficient photoelectric energy be provided by the system to operate the feeding mechanism for several days. The system is preferably able to store at lest three days' power in its batteries. In an alternative embodiment, the system includes a wind-powered generator, either in addition to or in place of the solar-powered generator.

Frame 40 is preferably constructed of carbon steel that has been coated to avoid corrosion and encrustation with marine life such as barnacles.

Grating panels 60 are preferably constructed of injection molded polymer reinforced with fiberglass, such as that sold under the trade name Corvex by the Fibergrate company of Dallas, Tex. Various marine environmental concerns make it preferable that the panels be made of black plastic. It is further preferred that the grating panels be painted with a black anti-fouling coating to prevent the build-up thereon of organic matter. The preferred anti-fouling coating at present is Super Tropical 280 antifouling paint, manufacture by Devoe Coatings or 565 Inorganic Zinc Primer manufactured by Briner Paint Mfg. Co., Inc. of Corpus Christi, Tex.

The panels may be any dimension preferred; both 3×10 feet and 4×12 feet have been found to be workable sizes. The openings in the grating are likewise any preferred size, although they must be small enough to retain the smallest fingerlings caged therein. If it is desired to raise fingerlings that are too small to be retained by the cage as constructed, cage 10 can be temporarily lined with a lantern net to retain the small fish, with the net being removed when the fish are large enough be retained by the grating.

While a preferred embodiment of the invention has been shown and described, modifications thereof can be made by one skilled in the art without departing from the spirit of the invention. For example, the invention has been described with respect to a hexagonal cage. Alternatively, the cage can be square, pentagonal, heptagonal, octagonal, circular or the like. Likewise the coatings can be varied or omitted, the precise method for connecting each of the various parts of the cage can be modified, and the dimensions can be modified, all without changing the fundamental nature of the fish cage. Likewise, another row of panels can be added, with the corresponding addition of internal supports as disclosed, so that the relative proportions of the dimensions of the cage are altered. In addition, various other equipment, such as underwater lights, may be added without departing from the scope of this invention.

What is claimed is:

1. A fish cage, comprising:

a substantially rigid frame;

a grating skin affixed to and enclosing said frame; and a feed tube extending through said grating skin for providing feed to the interior of the cage:

wherein said skin comprises a plurality of removable panels that are slidably mounted on said frame.

2. The fish cage according to claim 1 wherein said skin is coated with an antifouling agent.

3. A system for raising fish in open water, comprising:

a fish cage comprising a substantially rigid frame and a plurality of grating panels slidably mounted on said frame;

a feed storage bin;

a feed tube connected between said bin and said cage, for conducting feed out of said bin into said cage; and a control module for controlling the amount and times of feed flow out of said bin.

4. A system for raising fish in open water, comprising:

a fish cage;

a feed storage bin;

a feed tube connected between said bin and said cage for conducting feed out of said bin into said cage;

a control module for controlling the amount and times of feed flow out of said bin; and a water tank, water line and flush valve for flushing feed through said feed tube, said control module also controlling said flush valve.

5. The system according to claim 4, further including high and low feed level sensors and high and low water level sensors, said sensors being electrically connected to said control module.

6. The system according to claim 5 wherein all electrically operated equipment is powered by a 12 V battery.

7. The system according to claim 6 herein said battery is repeatably recharged by at least one photovoltaic cell.

* * * * *